United States Patent
Rao et al.

(10) Patent No.: US 6,710,964 B1
(45) Date of Patent: Mar. 23, 2004

(54) RAMP LOAD DISC DRIVE HAVING A PADDED SLIDER

(75) Inventors: Mukund C. Rao, Oklahoma City, OK (US); Ken L. Pottebaum, Yukon, OK (US); Mary C. Hipwell, Minneapolis, MN (US); Zine-Eddine Boutaghou, Vadnais Heights, MN (US); Dilip C. Patel, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 421 days.

(21) Appl. No.: 09/686,038

(22) Filed: Oct. 11, 2000

Related U.S. Application Data

(60) Provisional application No. 60/158,882, filed on Oct. 12, 1999.

(51) Int. Cl.[7] .............................................. G11B 21/02
(52) U.S. Cl. .................. 360/75; 360/235.8; 360/236.3; 360/236.2; 360/236.1
(58) Field of Search ................................ 360/75, 73.03, 360/235.7, 235.8, 236.3, 236.2, 236.1

(56) References Cited

U.S. PATENT DOCUMENTS

| | | | |
|---|---|---|---|
| 5,034,828 A | 7/1991 | Ananth et al. ................. 360/75 |
| 5,418,667 A | 5/1995 | Best et al. .................... 360/103 |
| 5,499,149 A | 3/1996 | Dovek ......................... 360/103 |
| 5,508,861 A | 4/1996 | Ananth et al. ................ 360/103 |
| 5,557,488 A | 9/1996 | Hamilton et al. ............. 360/104 |
| 5,625,512 A | 4/1997 | Smith .......................... 360/103 |
| 5,708,540 A | * 1/1998 | Ananth et al. ............ 360/235.4 |
| 5,768,055 A | 6/1998 | Tian et al. .................... 360/103 |
| 5,841,608 A | 11/1998 | Kasamatsu et al. .......... 360/103 |
| 5,870,251 A | 2/1999 | Boutaghou .................... 360/103 |
| 5,898,540 A | 4/1999 | Maruyama et al. ........... 360/103 |
| 5,991,118 A | 11/1999 | Kasamatsu et al. ........... 360/103 |
| 6,143,388 A | * 11/2000 | Bian et al. .................... 428/65.3 |
| 6,147,841 A | * 11/2000 | Rao ............................. 360/256.2 |
| 6,236,527 B1 | * 5/2001 | Uchiike et al. ................ 360/75 |
| 6,243,222 B1 | * 6/2001 | Boutaghou et al. ......... 360/73.03 |

* cited by examiner

*Primary Examiner*—Andrew L. Sniezek
*Assistant Examiner*—Jason Olson
(74) *Attorney, Agent, or Firm*—Westman, Champlin & Kelly

(57) ABSTRACT

The present invention is directed to a ramp load disc drive storage system having improved loading performance and a reduced likelihood of failure due to stiction and damage caused by contact between a slider and a disc surface during ramp load operations. The slider generally includes wear-resistive pads which allow for improved loading performance and reduce stiction between the slider and a disc surface. The pads also allow the ramp load disc drive storage system to be operated in a ramp load/unload mode or a contact start/stop mode. Additionally, a method of operating a ramp load disc drive is provided where the slider is loaded above a disc surface from a ramp prior to the disc reaching a full operating speed.

12 Claims, 4 Drawing Sheets

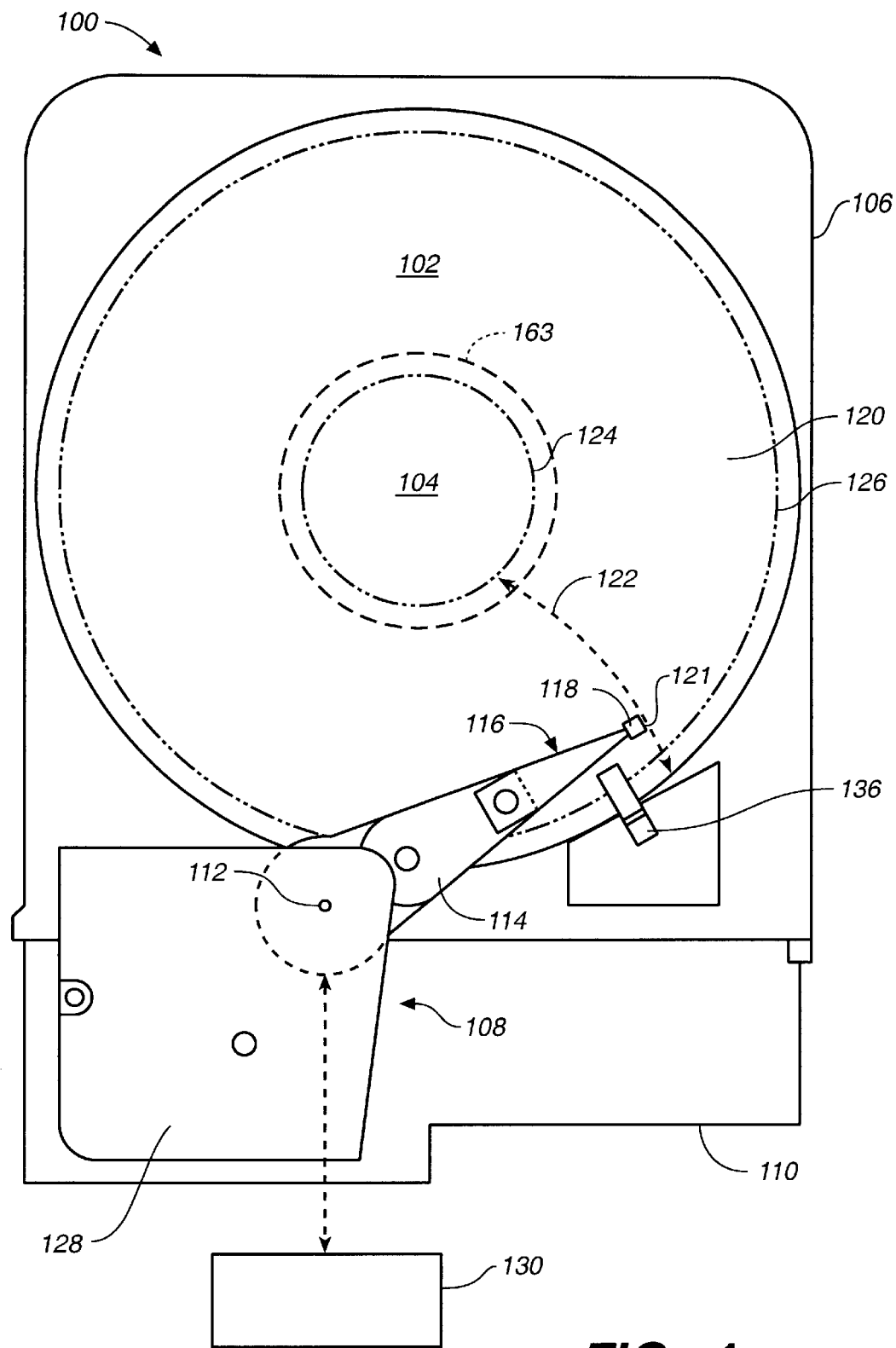
FIG._1

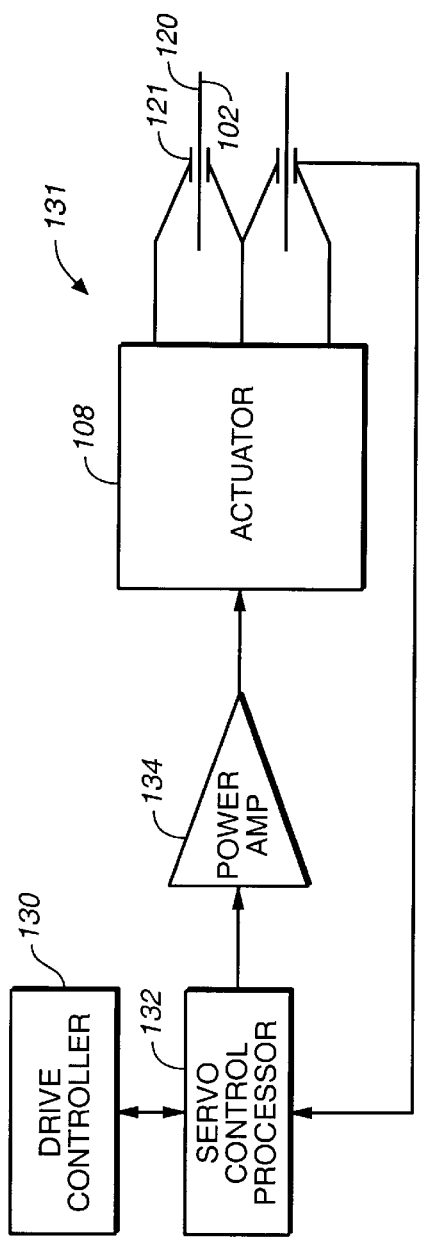
*FIG._2*
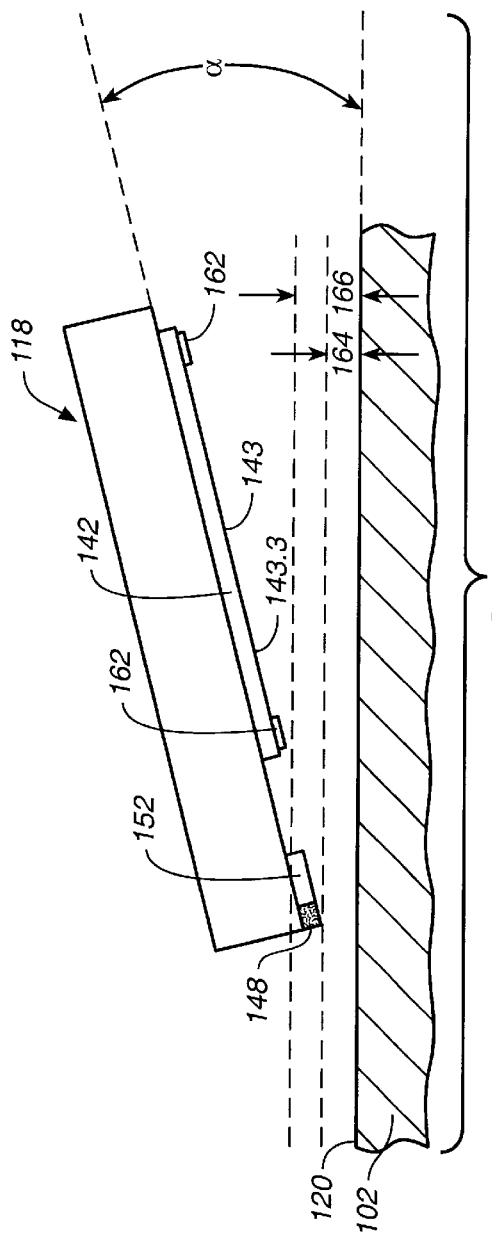
*FIG._5*

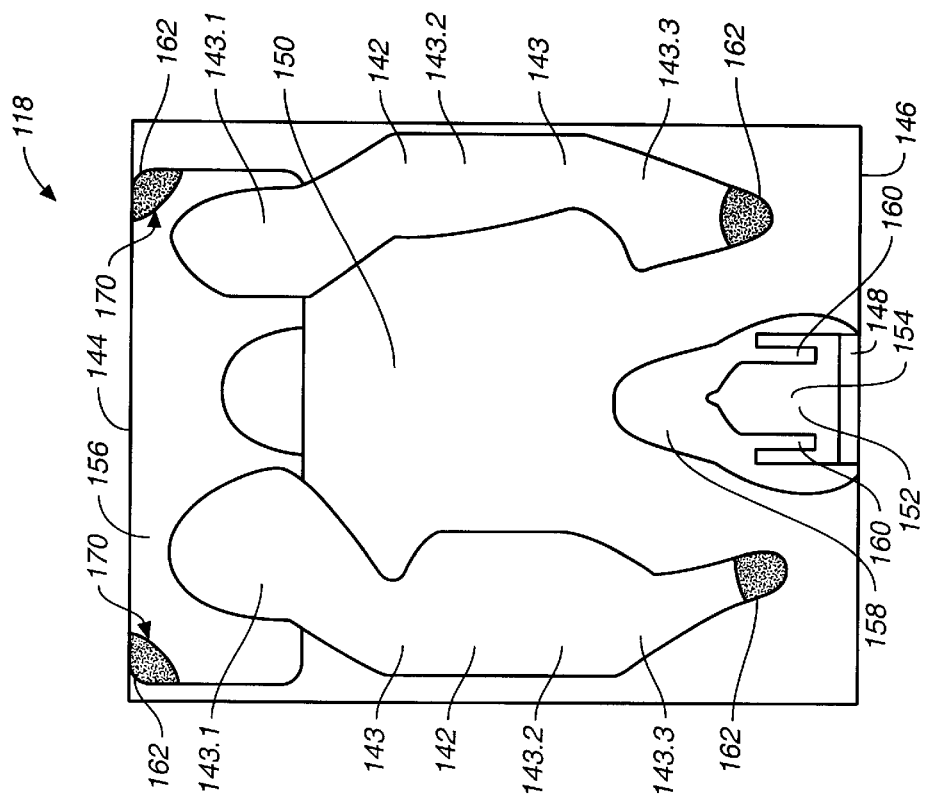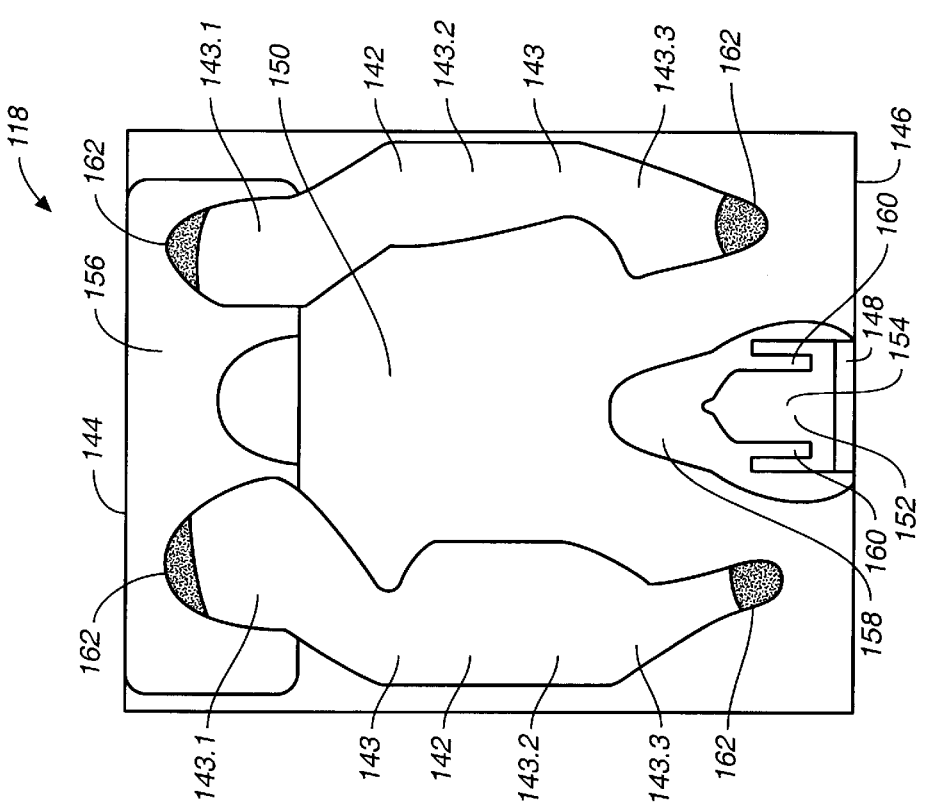

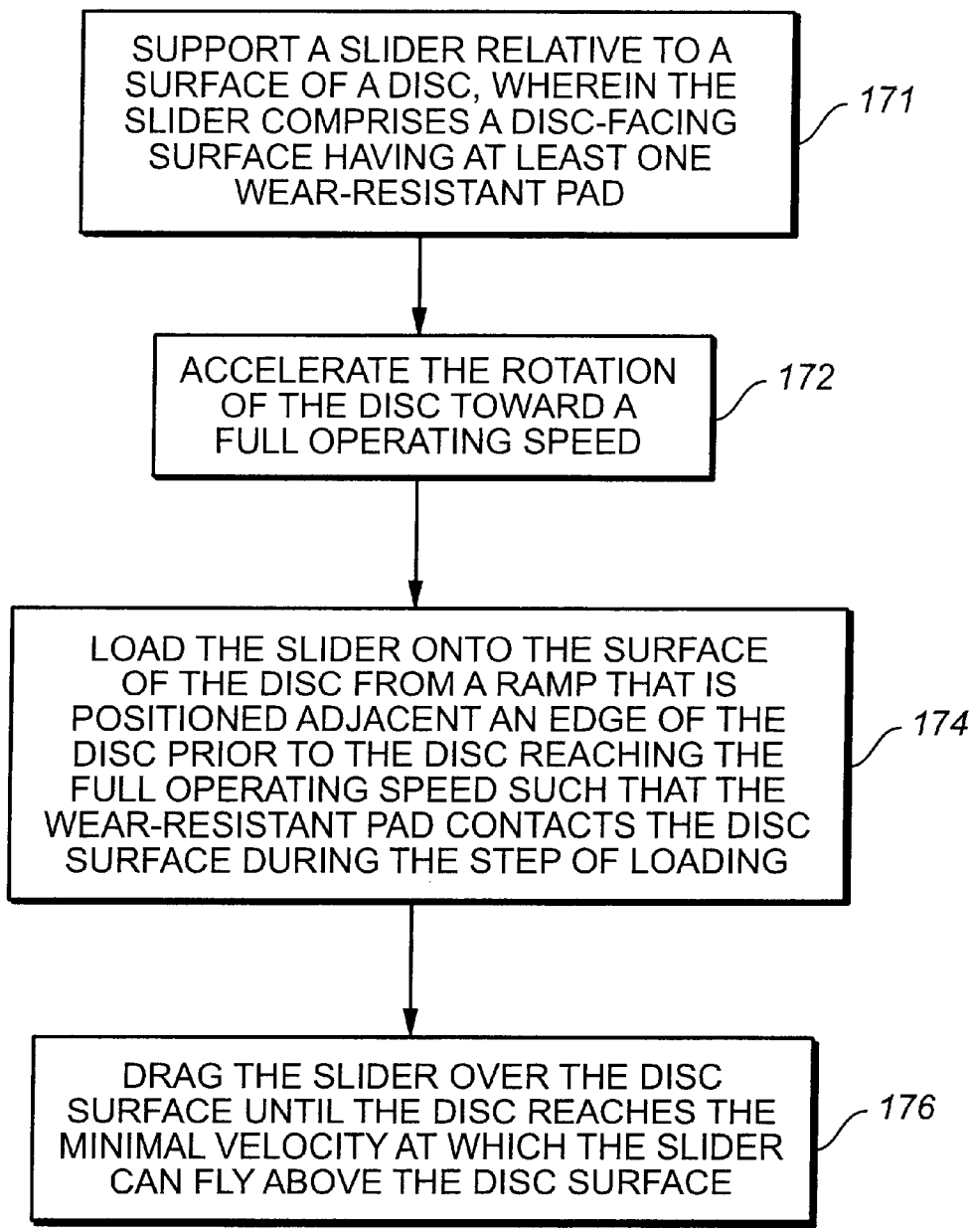
FIG._6

RAMP LOAD DISC DRIVE HAVING A PADDED SLIDER

CROSS-REFERENCE TO RELATED APPLICATION

The present invention claims the benefit of U.S. Provisional Application No. 60/158,882, entitled "PADDED SLIDERS FOR RAMP LOAD DISC DRIVES," filed Oct. 12, 1999.

FIELD OF THE INVENTION

The present invention relates to disc storage systems for storing information. More specifically, the present invention relates to padded sliders for use in ramp load and contact start/stop disc storage systems.

BACKGROUND OF THE INVENTION

Disc drives of the "Winchester" and optical types are well known in the industry. Such drives use rigid discs, which are coated with a magnetizable medium for storage of digital information in a plurality of circular, concentric data tracks. The discs are mounted on a spindle motor, which causes the discs to spin and the surfaces of the discs to pass under respective hydrodynamic (e.g. air) bearing disc head sliders. The sliders carry transducers, which write information to and read information from the disc surfaces.

An actuator mechanism moves the sliders from track-to-track across the surfaces of the discs under control of electronic circuitry. The actuator mechanism includes an actuator arm and a suspension. The slider is coupled to the suspension assembly through a gimbaled attachment. The suspension provides a load force to the slider which forces the slider toward the disc surface. The slider includes a bearing surface, which faces the disc surface. As the disc rotates, the disc drags air under the slider and along the bearing surface in a direction approximately parallel to the tangential velocity of the disc. As the air passes beneath the bearing surface, air compression along the air flow path causes the air pressure between the disc and the bearing surface to increase, which creates a hydrodynamic lifting force that counteracts the load force and causes the slider to lift and "fly" in close proximity to the disc surface to enable the transducing head carried by the slider to perform read or write operations. The gimbaled attachment to the suspension allows the slider to pitch and roll while following the topography of the disc.

One measurement of disc drive performance is the loading performance of the disc drive. This generally relates to the time that is required for the disc drive to become "ready" or be capable of reading data from, or writing data to, the disc surface. One contributing factor to the loading performance of disc drives is the time that is required to load the slider above the disc surface. This is typically the time that is required for the disc to accelerate its rotation to a full operating speed. The full operating speed of the disc drive is a rotational velocity, at which the tangential velocity of the disc generally exceeds a minimum operating velocity for the slider at all radial positions along the disc where the slider will operate. The minimum operating velocity relates to the minimum tangential velocity of the disc at which the air bearing, that is required for the slider to fly, can form.

Demands for increased disc storage capacity have led to lower slider fly heights and smoother disc surfaces. Unfortunately, the development of ultra-low flying sliders is impaired by a phenomenon called stiction. Stiction is caused by static friction and viscous sheer forces, which cause the slider to stick to the disc surface after periods of none-use. Stiction can be overcome by the spindle motor provided that sufficient torque to overcome the stiction can be produced. However, the head and/or the disc can be damaged when the slider is freed from the disc surface.

Contact Start/Stop (CSS) disc drives operate with the slider in contact with the disc surface during start and stop operations when there is insufficient disc rotational speed to maintain the bearing. To alleviate stiction problems, some CSS disc drives provide a dedicated landing zone near the inner diameter of the disc by generating, in a controlled fashion, asperities or texture, on the disc surface. The texture acts to reduce the area of contact at the slider-disc interface. Although this solution reduces the likelihood of disc drive failure due to stiction, there is also a reduction in the area of the disc surface that can be used for data storage. Furthermore, the presence of these asperities on the media surface can enhance the chance of slider-media contact during operation and thereby sets the limit to the true attainment of ultra-low flying sliders.

Another type of disc drive is a ramp load or ramp load/unload disc drive. Ramp load disc drives eliminate the need of having to "park" the slider on the disc surface by using a ramp, from which the slider is loaded above the disc surface and unloaded from the disc surface. The ramp is generally adapted to hold the slider by the suspension and is typically located adjacent the outer diameter of the disc. Prior to shutting the drive down, the actuator mechanism unloads the flying slider from the disc surface by rotating the suspension on to the ramp. Once the slider is unloaded, the disc is allowed to slow its rotational velocity from the full operating speed and the drive can be shut down. At start up, the actuator mechanism delays loading the slider on to the disc surface until the rotational velocity of the disc reaches the full operating speed.

The ramp load type of disc drive is one solution to the problems associated with CSS drives, such as the need for a dedicated landing zone and the slow loading times. The need for a dedicated landing zone is eliminated in the ramp load disc drive, since it is not necessary for the slider to land on the disc surface. As a result, ramp load disc drives are capable of maximizing the effective data storage are of the disc. However, ramp load disc drives are not problem free.

One problem that is encountered in ramp load disc drives is that the slider can occasionally contact the disc surface during ramp load operations when the required air bearing beneath the slider is not fully formed. This contact is undesirable due to the possibility of damaging the disc surface and/or the slider, which could result in data loss and disc failure. One possible solution to this is to provide a dedicated load zone at the outer diameter of the disc surface where no data is written. Unfortunately, this solution results in a decrease of the effective data storage area of the drive.

Ramp load disc drives can also encounter problems with stiction. This can occur, for example, when power to the disc drive is interrupted or when the suspension is knocked off the ramp. As a result, the potential exists for ramp load disc drives to fail due to stiction.

There exists a need for improving the loading performance of ramp load disc drives while reducing the likelihood of disc drive failure due to stiction and damage caused by contact between a slider and a disc surface during ramp load operations.

SUMMARY OF THE INVENTION

The present invention is directed to a ramp load disc drive storage system having improved loading performance and a reduced likelihood of failure due to stiction and damage caused by contact between a slider and a disc surface during ramp load operations. One aspect of the present invention is directed to a method of operating a ramp load disc drive where a slider is supported relative to a surface of a disc within the disc drive. The slider includes a contact pad on a disc-facing surface. A rotational velocity of the disc is accelerated toward a full operating speed and the slider is loaded onto the disc surface from a ramp that is positioned adjacent an edge of the disc prior to the disc reaching the full operating speed.

Another aspect of the present invention is directed toward a disc drive storage system that includes a disc, a slider, a suspension, and a ramp. The disc has a disc surface and is rotatable at an operating rotational velocity. The slider includes a leading slider edge, a trailing slider edge, and first and second rails positioned therebetween and disposed about a central recess. The first and second rails include contact pads. A third rail is disposed along the trailing slider edge, between the first and second rails, and supports a transducer. The first and second rails form first and second bearing surfaces, and the third rail forms a third bearing surface. The first and second pads are generally raised relative to the first, second, and third bearing surfaces. The suspension carries the slider at a steady-state attitude $\alpha$ when the disc is rotating at the operating rotational velocity such that the pads of the slider are spaced a distance from the disc surface that is greater than the distance that the transducer is spaced from disc surface. The suspension can also move to a parked position adjacent an edge of the disc surface where the suspension can engage the ramp.

Yet another aspect of the present invention is directed toward a disc drive storage system that includes a rotatable disc, a slider, a suspension that carries the slider, a ramp, and a servo control system. The disc drive storage system has an operating state and a power-down state. The rotatable disc has a disc surface. The slider supports a transducer relative to disc surface and includes at least one contact pad that faces the disc surface. The suspension is movable over the disc surface and has a first parked position adjacent an outer edge of the disc and a second parked position located over the disc surface. The ramp is positioned to engage a portion of the suspension when the suspension is in the first parked position. The servo control system is operatively coupled to the suspension and has ramp load/unload and contact start/stop (CSS) modes. When the disc is in the power-down state, the servo control system positions the suspension in the first parked position when in the ramp load/unload operating mode and in the second parked position when in the CSS mode.

BRIEF DESCRIPTION OF THE DRAWINGS

FIG. 1 is a simplified diagram of a storage disc system in accordance with the present invention.

FIG. 2 is a block diagram of a servo control loop in accordance with one embodiment of the invention.

FIGS. 3 and 4 are bottom plan views of a slider in accordance with various embodiments of the invention.

FIG. 5 is a side view of a slider flying above a disc in accordance with one embodiment of the invention.

FIG. 6 is a flowchart illustrating a method of operating a disc drive storage system in accordance with various embodiments of the invention.

DETAILED DESCRIPTION OF ILLUSTRATIVE EMBODIMENTS

FIG. 1 is a top view of a ramp load disc drive 100 including a slider in accordance with one embodiment of the present invention. Disc drive 100 includes a magnetic disc 102 mounted for rotational movement about an axis 104 defined by spindle of a spindle motor (not shown) that is contained within housing 106. Disc drive 100 also includes an actuator mechanism 108 mounted to a base plate 110 of housing 106 and pivotally moveable relative to disc 104 about axis 112. In an alternative embodiment, actuator mechanism 108 is a linear actuator. Actuator mechanism 108, includes actuator arm 114 and suspension assembly 116. Slider 118 is coupled to suspension assembly 116 through a gimbaled attachment which allows slider 118 to pitch and roll as it rides on a bearing above surface 120 of disc 102. Slider 118 operates in accordance with the embodiments set forth herein and supports a transducer to form head 121 for reading and writing information on disc 102. Actuator mechanism 108 is adapted to rotate slider 118 along arcuate path 122 between an inner diameter 124 and outer diameter 126 of disc 102. A cover 128 can cover a portion of actuator mechanism 108.

Drive controller 130 controls actuator mechanism 108 through a suitable connection. Drive controller 130 can be mounted within disc drive 100 or located outside of disc drive 100. During operation, drive controller 130 receives position information indicating a portion of disc 102 to be accessed. Drive controller 130 receives the position information from an operator, from a host computer, or from another suitable controller. Based on the position information, drive controller 130 provides a position signal to actuator mechanism 108. The position signal causes actuator mechanism 108 to pivot about axis 112. This, in turn, causes slider 118 to move radially over disc surface 120 along path 122. Once the transducer is appropriately positioned, drive controller 130 then executes a desired read or write operation.

Drive controller 130 and actuator mechanism 108 can form part of a servo control system that operates in a known closed loop, negative feedback manner so that the transducer carried by slider 118 is positioned over the desired portion of disc 102. FIG. 2 is a block diagram illustrating an example of a servo control system 131 that can be used with the present invention. Servo control system 131 includes a drive controller 130, which receives a command signal indicating that a certain portion of a disc 102 is to be accessed. Drive controller 130 then provides servo control processor 132 with a position signal relating to the location where actuator 108 is to position the head 121. Servo control processor 132 converts the position signal into an analog driving energy signal which is provided to actuator 108. In an illustrative embodiment, the driving energy signal is amplified by power amplifier 134, which then provides the required driving energy to actuator 108. In response to the driving energy, actuator 108 moves the data head 121 radially over the surface of the disc 102 for track seek operations and holds the data head 121 directly over a track on the disc 102 for track following operations.

During operation, as disc 102 rotates, air (and/or a lubricant) is dragged under the slider 118 and along bearing surfaces of the slider in a direction approximately parallel to the tangential velocity of disc 102. As the air passes beneath the bearing surfaces, air compression along the air flow path causes the air pressure between disc surface 120 and the bearing surfaces to increase, which creates a hydrodynamic lifting force that counteracts a load force provided by suspension 116 and causes slider 118 fly above and in close proximity to disc surface 120. The bearing is typically formed when the tangential velocity of disc 102, at the location of slider 118, reaches a minimum operational speed.

Thus, when the tangential velocity of disc 102, at the location of slider 118, is less than the minimum operational speed, slider 118 is in contact with disc surface 120.

In alternative embodiments of the present invention, disc drive 100 can be configured to operate in a contact start/stop (CSS) mode or a ramp load mode. In a contact start/stop (CSS) mode, the slider contacts the disc surface during start and stop operations when the tangential velocity of the disc is below the minimum operational speed. In a ramp load mode, disc drive 100 includes a ramp 136 (shown in FIG. 1) or other suitable support mechanism to prevent slider 118 to load and unload the slider from the disc surface 120 while avoiding or limiting contact between the slider and the disc surface during power-up and power-down operations. When disc drive 100 is to be powered down (where the disc decelerates to a non-rotating state), actuator mechanism 108, under the control of drive controller 130, rotates suspension assembly 116 to engage ramp 136 at outer diameter 126 before the tangential speed of disc 102 at the location of slider 118 drops below the minimum operational speed. Ramp 136 is configured to support suspension 116 such that slider 118 is held above disc surface 120. Likewise, when disc drive 100 is powered up, disc 102 accelerates toward a full operating rotational velocity at which disc 102 has a tangential velocity at outer diameter 126 that is larger than the minimum operational speed. As the disc 102 is accelerating, drive controller 130 controls actuator mechanism 108 to rotate suspension 116 off ramp 136 and position slider 118 over disc surface 120. As explained in more detail below, slider 118 has contact pads that allow drive controller 130 to load slider 118 onto the surface of disc 102 before disc 102 reaches its full operating rotational velocity and before the tangential velocity of disc 102 reaches the minimum velocity at which slider 118 can support an air bearing between the slider and the disc.

FIGS. 3 and 4 are bottom plan views of a slider 118 in accordance with various embodiments of the invention. Rails 142 generally extend between leading slider edge 144 and trailing slider edge 146 and, in one embodiment, are truncated prior to leading and trailing edges 144 and 146. Rails 142 form bearing surfaces 143, which face disc surface 120 (FIG. 1) during operation. Bearing surfaces 143 include leading portion 143.1 located proximate leading edge 144, a waist portion 143.2, and a trailing portion 143.3 located proximate trailing edge 146. Rails 142 are disposed about central recessed portion 150 which forms a sub-ambient pressure cavity when slider 118 is flying above disc surface 120 (FIG. 1). A center rail 152 supports transducing head 148 and includes bearing surface 154. Recessed step (or taper) 156 is located at leading edge 144 and has a depth that is between the depth of recessed portion 150 and bearing surfaces 143. Step 156 begins the compression of air under slider 118 to assist in forming the air bearing under bearing surfaces 143. Center rail 152 can also include a step (or taper) 158 and channels 160 to similarly assist in the formation of an air bearing under bearing surface 154.

One aspect of the invention relates to reducing wear or other damage caused during contact between slider 118 and disc surface 120 by including contact pads 162, on bearing surfaces 143 of rails 142. In addition, pads 162 can be positioned such that they are the only portion of slider 118 that contacts disc surface 120 when slider 118 collides with disc surface 120 during ramp load and unload operations. These areas can be identified by standard modeling techniques. In one embodiment, contact pads 162 are formed of a material that forms a more chemically benign and low friction interface with disc surface 120 than would be formed using the slide substrate material. The material preferably serves to reduce or prevent the formation of debris, physical damage to slider 118, damage to disc surface 120 and damage to stored data, in the event of contact between pads 162 and disc surface 120. This material is preferably tribologically compatible with disc 102 and any lubricant thereon. One such suitable material for pads 162 is diamond-like carbon (DLC). Pads 162 can be formed entirely of a DLC or similar material or can be formed by etching or milling the substrate and then applying a DLC layer to the pad surface. Other additive or subtractive fabrication methods can also be used.

Pads 162 allow disc drive 100 to operate in either a ramp load/unload mode or a CSS mode. In one embodiment, the operating mode of disc drive 100 is set in software executed by servo control processor 132 within the servo control system 131 (shown in FIG. 2). Drive controller 130 can select between the operating modes by providing an appropriate control signal to servo control processor 132. In another embodiment, disc drive 100 is configured to operate in either mode during manufacturing of drive 100.

In the ramp load/unload mode, disc drive 100 operates as previously described by loading and unloading slider 118 onto and off of disc surface 120 with a ramp 136 (shown in FIGS. 1 and 2). Thus, when disc drive 100 is in the ramp load/unload mode and disc 102 is in a non-rotating state, suspension 116 is held in a "parked" position at which the suspension is held by ramp 136 and slider 118 is unloaded from disc surface 120. In the CSS mode, slider 118 takes off from and lands onto disc surface 120 during the start and stop of disc rotation. Thus, slider 118 becomes "parked" on the disc surface when disc 102 is in a non-rotating state. In one embodiment, disc 102 has a dedicated landing zone 163 positioned adjacent inner diameter 124. Landing zone 163 can be smooth or can be textured to further reduce stiction between contact pads 162 and disc surface 120.

In the CSS mode, or if suspension 116 falls off of ramp 136, the low stiction interface formed between contact pads 162 and disc surface 120 allows slider 118 to "take-off" from disc surface 120 easily when disc 102 is accelerated to the minimum tangential velocity at which slider 118 can fly. Additionally, drive controller 130 (FIG. 1) can switch servo control processor 132 from the ramp load mode to the CSS mode if for some reason the ramp load-unload operation is not possible or fails.

As mentioned above, contact pads 162 are contact pads which are chemically and mechanically compatible with disc 102. Preferably, pads 162 are formed of diamond-like carbon (DLC) due to its mechanical and chemical compatibility with the disc 102 (FIG. 1) and because it prevents disc lube breakdown caused by interaction with the slider body material. This feature reduces wear and damage to the disc surface caused by contact with slider 118 during ramp load operations. Pads 162 can each have an area of between about 50 square micrometers ($\mu m^2$) to about 5000 $\mu m^2$ and a height of approximately 300 angstroms. The height, width, and shape of pads 162 can be made compatible with needed clearances for proper disc drive operation.

Various embodiments of the present invention include locating pads 162 proximate leading portion 143.1, waist portions 143.2, and/or trailing portions 143.3. In one embodiment of the invention, contact pads 162 are positioned at leading and trailing bearing portions 143.1 and 143.3, respectively, as shown in FIG. 3. In another embodiment of the invention, contact pads 162 are located proximate leading edge corners 170 of step 156 rather than at leading portions 143.1, as shown in FIG. 4. Other locations for pads 162 are possible as well, including placing a plurality of pads over bearing surfaces 143 of rails 142.

FIG. 5 shows a side view of slider 118 flying above disc surface 120 of disc 102. Elements having the same or similar numbers as those in FIGS. 3 and 4 represent the same or similar elements in FIG. 5. Slider 118 is shown as having a steady-state attitude α with respect to disc surface 120. Slider reaches this steady-state attitude α when disc 102 is rotating at a full operational angular velocity. During this operational state, transducing head 148 of center rail 152 is separated from disc surface 120 by a distance 164 that is less than a distance 166 that separates the lowest pad 162 (generally located proximate trailing bearing surface 143.3) from disc surface 120. Typically, transducer 148 is positioned at or near the closest point on the bearing surface formed by center rail 152 to disc surface 120. This ensures that pads 162 do not interfere with or limit the fly height 164 of transducing head 148.

Another aspect of the present invention is directed toward a method of operating ramp load disc drive 100, which improves the loading performance of disc drive 100. The loading performance of disc drive 100 relates to the time that is required for disc drive 100 to become "ready" or be capable of reading data from, or writing data to, disc surface 120. FIG. 6 shows a flowchart of the general method in accordance with one embodiment of the present invention. At step, 171 slider 118 is supported relative to surface 120 of disc 102, where slider 118 includes at least one contact pad 162 on a surface of slider 118 that faces disc 102. At step 172, the rotation of disc 102 is accelerated toward a full operating rotational velocity. At step 174, slider 118 is loaded onto disc surface 120 from ramp 136 (FIG. 1) prior to disc 102 reaching the full operating speed, such that wear resistant pads 162 contact disc surface 120 during step 172. Here, slider 118 is loaded above disc surface 120 when disc 102 has a non-operational rotational velocity that is less than the full operating rotational velocity. As disc 102 continues to accelerate to the full operating rotational velocity, the tangential velocity of disc 102 at the location of slider 118 reaches the minimum operating velocity thereby allowing slider to begin flying over disc surface 120. As a result, slider 118 becomes ready to read and write data as soon as disc 102 is rotating at a sufficient speed. As a result, this embodiment of the present invention improves loading performance of slider 118 and results in disc drive 100 becoming ready faster than prior art ramp load disc drives that do not load the slider onto the disc surface until the disc is at its full operating speed.

In one embodiment, the non-operational rotational velocity provides a tangential velocity at outer diameter or edge 126 (FIG. 1) of disc 102 that is less than the minimal operating velocity for slider 118. In another embodiment, indicated at step 176, slider 118 is dragged along disc surface 120 where pad 162 is in contact with disc surface 120. As disc 102 continues to accelerate to the full operational speed, the tangential velocity of disc 102 at slider 118 increases to the minimal operating velocity and an air bearing is formed under slider 118 such that slider 118 begins to fly above disc surface 120. Once slider 118 begins flying, disc drive 100 becomes ready and is capable of reading information from and writing information to disc 102.

In summary, various aspects of the present invention are directed to a ramp load disc drive storage system 100 that includes a slider 118 having pads 162 which reduce stiction, damage to disc surfaces 120 during ramp load operations, and can improve the loading performance of disc drive storage system 100. One aspect of the present invention is directed to a method of operating a ramp load disc drive 100 where a slider 118 is supported relative to a surface of a disc 120 within the disc drive 100. The slider 118 includes a contact pad 162 on a disc-facing surface. A rotational velocity of the disc 102 is accelerated toward a full operating speed and the slider 118 is loaded onto the disc surface 120 from a ramp 136 that is positioned adjacent an edge 126 of the disc 102 prior to the disc reaching the full operating speed.

Another aspect of the present invention is directed toward a disc drive storage system 100 that includes a disc 102, a slider 118, a suspension 116, and a ramp 136. The disc 102 has a disc surface 120 and is rotatable at an operating rotational velocity. The slider 118 includes a leading slider edge 144, a trailing slider edge 146, and first and second rails 142 positioned between leading and trailing slider edges 144 and 146, respectively, and disposed about a central recess 150. The first and second rails 142 include first and second contact pads 162. A third rail 152 is disposed along the trailing slider edge 146, between the first and second rails 142, and supports a transducer 148. The first and second rails 142 form first and second bearing surfaces 143, and third rail 152 forms third bearing surface 154. The first and second pads 162 are raised relative to the first and second bearing surfaces 143 and the third bearing surface 154. The suspension 116 carries the slider 118 at a steady-state attitude a when the disc 102 is rotating at the operating rotational velocity such that the pads 142 of the slider 118 are spaced a distance 166 from the disc surface 120 that is greater than the distance 164 that the transducer 148 is spaced from disc surface 120. The suspension 116 can move to a parked position adjacent an edge 126 of the disc surface 120 where the suspension 116 engages the ramp 136.

Yet another aspect of the present invention is directed toward a disc drive storage system 100 that includes a rotatable disc 102, a slider 118, a suspension 116 that carries the slider 118, a ramp 136, and a servo control system 131. The disc drive storage system has an operating state and a power-down state. Rotatable disc 102 has a disc surface 120. The slider 118 supports a transducer 148 relative to disc surface 120 and includes at least one contact pad 142 that faces the disc surface 120. The suspension 116 is movable over the disc surface 120 and has a first parked position adjacent an outer edge 126 of the disc 102 and a second parked position located over the disc surface 120. The ramp 136 is positioned to engage a portion of the suspension 116 when the suspension 116 is in the first parked position. The servo control system 131 is operatively coupled to the suspension 116 and has ramp load/unload and contact start/stop (CSS) modes. When the disc 102 is in the power-down state, the servo control system 131 positions the suspension 116 in the first parked position when in the ramp load/unload operating mode and in the second parked position when in the CSS mode.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed.

What is claimed is:

1. A method of operating a ramp load disc drive, the method comprising steps of:
   (a) supporting a slider relative to a surface of a disc within the disc drive, wherein the slider comprises a disc-facing surface having at least one contact pad;
   (b) accelerating rotation of the disc toward a full operating speed relative to the slider; and
   (c) loading the slider onto the surface of the disc from a ramp that is positioned adjacent an edge of the disc during step (b) prior to the disc reaching the full operating speed.

2. The method of claim 1, wherein the loading step (c) is performed when the disc has non-operational rotational velocity, which is less than the full operating velocity.

3. The method of claim 2, wherein the non-operational rotational velocity corresponds to a tangential velocity that is less than a minimal operating velocity at which the slider can fly above the disc surface.

4. The method of claim 3, wherein the method further comprises a step of (d) dragging the slider along the disc surface during step (c) until the disc reaches the minimal operating velocity.

5. A disc drive storage system, comprising:
   a disc having a disc surface and rotatable at an operating rotational velocity;
   a slider comprising a leading slider edge, a trailing slider edge, first and second rails positioned between the leading and trailing slider edges and disposed about a central recess in the slider, a recessed step extending between the first and second rails adjacent the leading edge of the slider and having leading edge corners, pads formed on the recessed step proximate the leading edge corners, first and second raised contact pads formed on the first and second rails, respectively, and a transducer supported adjacent the trailing slider edge, wherein the first and second rails form first and second bearing surfaces, respectively;
   a suspension which carries the slider at a steady state attitude relative to the disc surface when the disc rotates at the operating rotational velocity and which is movable to a parked position adjacent an edge of the disc surface wherein the first and second contact pads are spaced a greater distance from the disc surface than the transducer when the slider has the steady state attitude; and
   a ramp positioned adjacent the edge of the disc surface to engage the suspension when the suspension is in the parked position.

6. The disc drive storage system of claim 5, including a third rail supporting the transducer and having a third bearing surface.

7. The disc drive storage system of claim 5, wherein:
   the first and second bearing surfaces each have a leading portion and a trailing portion; and
   the first and second pads are formed on the trailing portions of the first and second bearing surfaces, respectively.

8. The disc drive storage system of claim 5, wherein:
   the first and second bearing surfaces each have a leading portion and a trailing portion;
   the first and second pads are formed on the trailing portions of the first and second bearing surfaces, respectively; and
   the slider further comprises third and fourth contact pads formed on the leading portions of the first and second bearing surfaces, respectively.

9. The disc drive storage system of claim 5, wherein the contact pads are formed of diamond-like carbon.

10. A disc drive storage system comprising:
    an operating state and a power-down state;
    a rotatable disc having a disc surface;
    a slider supporting a transducer relative to the disc surface and comprising at least one contact pad facing the disc surface;
    a suspension which carries the slider and is movable over the disc surface, wherein the suspension has a first parked position adjacent an outer edge of the disc surface and a second parked position over the disc surface;
    a ramp positioned to engage a portion of the suspension and unload the slider from the disc surface when the suspension is in the first parked position; and
    a servo control system operatively coupled to the suspension and having selectable operating modes, including a ramp load-unload operating mode in which the servo control system positions the suspension in the first parked position when the disc drive data storage system is in the power-down state, and a contact start-stop operating mode in which the servo control system positions the suspension in the second parked position when the disc drive storage system is in the power-down state.

11. The disc drive storage system of claim 10, wherein the slider includes a leading slider edge, a trailing slider edge, first and second rails positioned between the leading and trailing slider edges and disposed about a central recess in the slider, first and second raised, contact pads formed on the first and second rails, respectively, a third rail disposed along the trailing slider edge, between the first and second rails, and a transducer supported by the third rail, wherein the first, second and third rails form first, second and third bearing surfaces, respectively, and the first and second pads have surfaces that are raised relative to the first, second and third bearing surfaces.

12. The disc drive storage system of claim 10, wherein the pad is formed of diamond-like carbon.

* * * * *